United States Patent
Wagner (10) Patent No.: US 11,269,083 B2
(45) Date of Patent: Mar. 8, 2022

(54) METHOD FOR DETERMINING A POSITION OF A MOTOR VEHICLE

(71) Applicant: Robert Bosch GmbH, Stuttgart (DE)

(72) Inventor: Marcus Wagner, Schwaigern (DE)

(73) Assignee: Robert Bosch GmbH, Stuttgart (DE)

( * ) Notice: Subject to any disclaimer, the term of this patent is extended or adjusted under 35 U.S.C. 154(b) by 60 days.

(21) Appl. No.: 16/760,001

(22) PCT Filed: Nov. 14, 2018

(86) PCT No.: PCT/EP2018/081192
§ 371 (c)(1),
(2) Date: Apr. 28, 2020

(87) PCT Pub. No.: WO2019/096825
PCT Pub. Date: May 23, 2019

(65) Prior Publication Data
US 2020/0341155 A1   Oct. 29, 2020

(30) Foreign Application Priority Data
Nov. 17, 2017   (DE) ...................... 10 2017 220 551.2

(51) Int. Cl.
*G01S 19/49*   (2010.01)
(52) U.S. Cl.
CPC .................................... *G01S 19/49* (2013.01)
(58) Field of Classification Search
CPC ......... G01S 19/40; G01S 19/49; G01C 21/12; G01C 21/165; G01C 21/28
See application file for complete search history.

(56) References Cited

U.S. PATENT DOCUMENTS

| | | | |
|---|---|---|---|
| 2009/0135057 A1* | 5/2009 | Vollath | G01S 19/44 342/357.27 |
| 2013/0099963 A1 | 4/2013 | Wu et al. | |

(Continued)

FOREIGN PATENT DOCUMENTS

| | | |
|---|---|---|
| EP | 0934535 B1 | 11/1999 |
| JP | H07-286853 A | 10/1995 |
| JP | 2013-250144 A | 12/2013 |

OTHER PUBLICATIONS

J.L. Weston et al., Modern inertial navigation technology and its application, Electronics & Communication Engineering Journal, vol. 12(2), p. 49-64, 2000 (Year: 2000).*

(Continued)

*Primary Examiner* — Bernarr E Gregory
*Assistant Examiner* — Fred H Mull
(74) *Attorney, Agent, or Firm* — Maginot, Moore & Beck LLP (57) ABSTRACT

A method for determining a position of a motor vehicle includes receiving a first signal containing an absolute position of the motor vehicle, receiving a second signal containing a change in the position of the motor vehicle, generating first position information corresponding to the absolute position from the first signal when the first signal is available, and continued from the second signal according to the change in position when the first signal is not available, generating second position information corresponding to the first position information at the beginning of first time segments and continued over the first time segments from the second signal according to the change in position, and determining an error in the first position information using the second position information.

12 Claims, 4 Drawing Sheets

(56) References Cited

U.S. PATENT DOCUMENTS

2015/0084812 A1    3/2015  Sernik
2018/0088241 A1*   3/2018  Altrichter ............... G01S 19/40

OTHER PUBLICATIONS

J.S. Warner et al., GPS Spoofing Countermeasures, http://www.homelandsecurity.org/bulletin/Dual Benefit/warner_gps_spoofing.html, 2008 (Year: 2008).*
A. Broumandan et al., Spoofing Detection Using GNSS/INS/Odometer Coupling for Vehicular Navigation, Sensors, vol. 18(5), 18 pages, 2018 (Year: 2018).*
International Search Report corresponding to PCT Application No. PCT/EP2018/081192, dated Feb. 11, 2019 (German and English language document) (6 pages).

* cited by examiner

METHOD FOR DETERMINING A POSITION OF A MOTOR VEHICLE

This application is a 35 U.S.C. § 371 National Stage Application of PCT/EP2018/081192, filed on Nov. 14, 2018, which claims the benefit of priority to Serial No. DE 10 2017 220 551.2, filed on Nov. 17, 2017 in Germany, the disclosures of which are incorporated herein by reference in their entirety.

BACKGROUND

Various options are known for determining the position of a motor vehicle. In particular, methods of satellite navigation are used. However, if a corresponding satellite signal is not available, for example when driving through a tunnel, the position of the vehicle cannot be determined or can only be determined inadequately using such methods.

SUMMARY

A particularly advantageous method for determining a position of a motor vehicle is provided here. The dependent claims specify particularly advantageous refinements of the method.

In particular a device for high-accuracy position determination can be used in the described method. In such a device, inertial sensors (in particular for rotation rates and accelerations in three directions each) are linked to GNSS (for satellite navigation) to obtain high-accuracy position information. Such accurate items of position information can be used in particular for highly automated driving (HAD). The described method can be applied to inertial signals with GNSS support, but also to any other sensor output having derived and integrated signals.

Using the described method, the position of the motor vehicle is preferably determined via satellite navigation if a corresponding signal is available. For this purpose, in step a) of the described method, a first signal is received which comprises an absolute position of the motor vehicle.

The first signal can be in particular a signal for satellite navigation, in particular in the sense of GPS (global positioning system). In this case, the first signal can be generated, for example, by a GNSS receiver and emitted to a control device, which is intended and configured to carry out the described method. Alternatively, however, it is also possible that the first signal enables the determination of an absolute position in another manner, for example in that the first signal specifies the distance from one or preferably multiple fixed points (in relation to the Earth's surface). The absolute position is the position of the motor vehicle in a reference system in which the Earth's surface (i.e., for example, the road on which the motor vehicle is driving) is at rest. The absolute position can be specified in particular in GPS coordinates.

The position of the motor vehicle can already be basically determined using the first signal. However, this is only possible if the first signal is available. When driving in a tunnel, for example, the reception of a GNSS receiver is often restricted or prevented entirely. The determination of the position of the motor vehicle using the first signal is then not possible. The fact that the first signal is not available means in particular that the first signal cannot be created as desired, for example, because of a lack of GNSS reception. The GNSS receiver can then output a corresponding error signal, for example. The GNSS receiver can also furthermore output a signal in which the last known position is contained as the position of the motor vehicle. The first signal is also not available in this case according to the interpretation used here of the concept of non-availability. If the first signal is not available, it can be assumed in particular for the position determination in the control device that the first signal specifies the absolute position at the last known value.

Using the described method, the position of the motor vehicle can also be determined if the first signal is not available. For this purpose, in step b) of the described method, a second signal is received, which comprises a change of the position of the motor vehicle. The second signal is also preferably received by the control device, which is intended and configured to carry out the described method.

The second signal can be obtained in particular from vehicle-intrinsic data. Thus, for example, the rotational movement of the tires can be detected. The movement of the motor vehicle can be ascertained therefrom. In particular, a velocity at which the motor vehicle moves can be ascertained. In addition, the steering wheel angle can also be detected, so that a direction change can also be recognized. If the steering wheel angle is not detected, it can be assumed, for example, that the motor vehicle moves at the detected velocity in a uniform direction.

The second signal can be generated, for example, by one or more sensors for the speed of a wheel and/or by a corresponding electronic unit, to which such sensors are connected. If the steering wheel angle is also to be taken into consideration, corresponding sensors are preferably also connected to the corresponding electronic unit. The second signal can also be output by another control device. In particular, the second signal can be a signal available via a bus system of the motor vehicle. The second signal can thus be, for example, the signal which also enables the display of the instantaneous velocity via the speedometer.

A change of the position of the motor vehicle in relation to a known starting position can be determined from the velocity of the motor vehicle and optionally also from the steering wheel angle. In particular, it is possible to determine the starting position (as an absolute position) via satellite navigation using the first signal and to make use of the second signal upon non-availability of the first signal. In particular, it can be determined proceeding from a last position known from the satellite navigation (at which the reception was lost) using the second signal how the motor vehicle has moved further from this last known position. It can be assumed in particular in this case that the motor vehicle moves in the last direction detected via GNSS. A direction change due to steering wheel angle can be taken into consideration in this case. A direction change (for example when cornering) recognized before loss of the GNSS reception can also be taken into consideration and continued.

For this purpose, in step c) of the described method, a first item of position information is generated, which corresponds to the absolute position from the first signal, if the first signal is available, and which is continued according to the change of the position from the second signal, if the first signal is not available.

The first item of position information is thus obtained in principle from the first signal and possibly also from the second signal. The second signal can be considered to be always available. The continuation of the position determination using the second signal can therefore, for example, enable the determination of the position of the motor vehicle even when driving in a tunnel. However, if the second signal is used, an error, in particular due to integrations to be carried out, can build up over time and increase strongly. This is in particular because possible inaccuracies of the change of the position contained in the second signal accumulate over the duration of the continuation. Even small inaccuracies in the second signal can result in a large error if the continuation of the position determination via the second signal is necessary over a long time (for example when driving in a long tunnel).

It can be assumed that the first signal is not always available, but is available most of the time. The first signal can therefore be used to assist the second signal. This means that the absolute position of the motor vehicle is determined using the first signal if this is possible. If the first signal is not available, the last absolute position ascertained from this signal can be used as a support, from which the continuation is performed using the second signal.

The method provided here is used in particular to improve the quality of the first item of position information. The accuracy of the position of the motor vehicle determined using the method is thus improved. For this purpose, the above-described signals are used and the errors thereof are minimized.

In step d) of the described method, a second item of position information is generated, which corresponds at the beginning of first time periods to the first item of position information and which is continued over the first time periods according to the change of the position from the second signal.

The second item of position information is introduced as an auxiliary variable. Like the first item of position information, the second item of position information is also ascertained both using the first signal and using the second signal. In contrast to the first item of position information, however, the second signal is not used for the second item of position information due to non-availability of the first signal. Instead, the second signal is made use of independently of the availability of the first signal in the predetermined first time periods. The non-availability of the first signal is thus possibly simulated.

The first time periods preferably each have equal length. It is also preferable for the first time periods to be arranged at equal time intervals from one another. In particular, the first signal and/or the second signal can thus periodically be made use of during the determination of the second item of position information. The first time periods can be predetermined in particular via a release signal (which can also be referred to as a flag signal). The release signal can be designed in particular so that it only assumes two discrete values. Depending on the value of the release signal, the determination of the second item of position information at a defined point in time then takes place via the first signal or via the second signal. The release signal is preferably sent automatically at regular intervals and acts like a signal for suppressing the support. An error is thus forced in the second item of position information by the release signal.

A new item of position information is thus obtained by the second item of position information, the error of which increases with time (at least over the first time periods). An error of the first item of position information can be ascertained using the second item of position information. This is performed in step e) of the described method, in which an error of the first item of position information generated according to step c) is ascertained using the second item of position information generated according to step d).

In one embodiment variant, the second signal (2) received in step b) comprises a first derivative of the position. A first derivative of the position is in particular an item of velocity information. In a further embodiment variant, the second signal received in step b) comprises a position itself. In still a further embodiment variant, the second signal received in step b) can also comprise a second derivative of a position plus a value of a first derivative at a defined point in time. A change of the position of the motor vehicle can also be determined from this combination of items of information. A radar or laser system can be a possible source for the second signal.

This can be performed in particular according to the two following embodiments.

In one preferred embodiment of the method, the error in step e) is determined as a difference between the first item of position information and the second item of position information.

In a further preferred embodiment of the method, the error in step e) is determined as a difference between the absolute position from the first signal and the second item of position information.

The first item of position information differs from the absolute position from the first signal only if the first signal is not available. This difference can be considered to be small for the present purposes. Therefore, the comparison can be performed both using the first item of position information and using the absolute position from the first signal. The use of the first item of position information is more precise, whereas the use of the first signal can be simpler. The deviation between the second item of position information and the first item of position information or the absolute position from the first signal, respectively, is the error to be determined in step e).

The type and the size of the error can be concluded from the difference of the second item of position information and the first item of position information or the absolute position from the first signal, respectively. The determination of the error is preferably performed at a plurality of points in time (if admissibility requirements permit this). For example, the error can be determined for each of the first time periods and thus in particular periodically. At the beginning of each first time period, the first item of position information corresponds to the absolute position of the first signal. Preferably, at the end of each first time period, the error is determined as the difference between the second item of position information and the first item of position information or the absolute position from the first signal, respectively. The error thus specifies the deviation which has accumulated over a first time period.

If all first time periods are of equal length, the errors determined at the end of the first time periods can be compared to one another. The error can thus be checked again and again and reevaluated.

In particular, it can be ascertained by step e) how accurate the second signal presently is.

The specified method steps can be carried out in any arbitrary sequence and also chronologically overlapping, as long as at least steps c) and d) do not begin before the beginning of steps a) and b) and as long as step e) does not begin before the beginning of steps c) and d).

In a further preferred embodiment of the method, the second item of position information in second time periods corresponds to the first item of position information.

The second time periods preferably each have equal length. It is also preferable for the second time periods to be arranged at equal time intervals from one another. First and second time periods preferably alternate. This can take place periodically in particular. The second time periods can be, for example, of equal length to the first time periods. In particular, it is preferable for there to be only first and second time periods.

In a further preferred embodiment, the method furthermore comprises the following method step:

f) outputting an output signal which comprises the position of the motor vehicle, which is obtained from the first item of position information ascertained according to step c) by correction using the error ascertained in step e).

Carrying out step f) does not begin before the beginning of step e).

The output signal is preferably generated and output by the control device, which is intended and configured to carry out the described method. The position of the motor vehicle contained in the output signal can be understood in particular as a final result of the described method.

The output signal basically comprises the first item of position information as the determined position of the motor vehicle. However, the error ascertained according to step e) is taken into consideration. The error can thus be subtracted before the output of the final output signal.

In a further preferred embodiment of the method, the correction in step f) is performed using an instantaneous value of the error ascertained according to step e).

It can be assumed in particular that the type and size of the error does not change rapidly. The error can thus be assumed to be constant between two points in time of the determination (i.e. in particular the ends of the first time periods).

Due to the repeating determination of the error, however, a chronological change of the error can also be recognized and/or taken into consideration. Therefore, in a further preferred embodiment of the method, a time curve of the error ascertained according to step e) is determined in particular, wherein the correction in step f) is performed with extrapolation of the time curve of the error.

In this embodiment, the error is not assumed to be constant per se between two points in time of the determination (i.e. in particular the ends of the first time periods). Instead it is assumed that the chronological development of the error corresponds to a curve which can be extrapolated. For example, if a linear rise of the error was established for prior determination points in time, it can be assumed that the error will also rise linearly in future. This also applies accordingly, for example, in the case of quadratic or exponential behavior. The instantaneous error between two determination points in time can be estimated particularly well by extrapolation according to a recognized curve. In the case of a prior curve recognized as constant, the extrapolation can also consist of considering the error to be constant as in the preceding embodiment.

A control device, which is configured to carry out the described method, is provided as a further aspect. The special advantages and design features described further above for the method are applicable and transferable to the control device.

Furthermore, a computer program is provided which is configured to execute all steps of the described method. Moreover, a machine-readable storage medium is provided on which the described computer program is stored. The special advantages and design features described further above for the method and the control device are applicable and transferable to the computer program and the machine-readable storage medium.

BRIEF DESCRIPTION OF THE DRAWINGS

Further details of the disclosure and exemplary embodiments, to which the disclosure is not restricted, however, will be explained in greater detail on the basis of the drawings. In the schematic figures.

DETAILED DESCRIPTION

Figure 1:
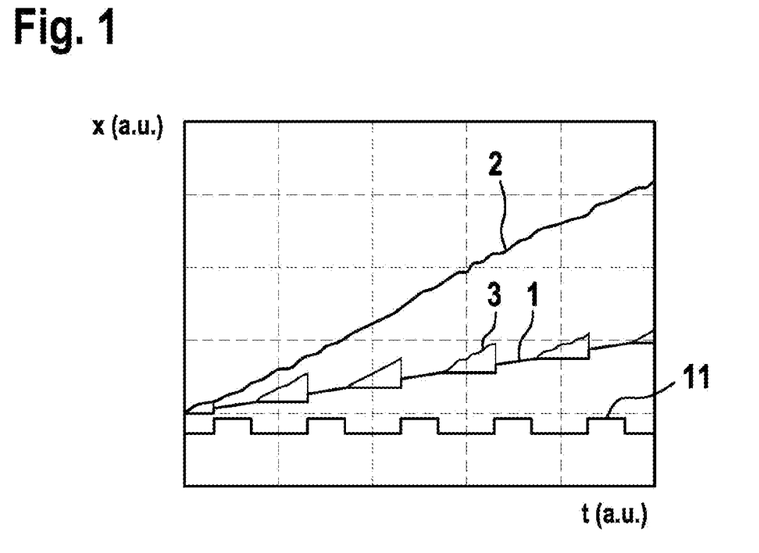
FIG. 1: shows an illustration of a first example of a method for determining the position of a motor vehicle.

FIG. 1 shows an illustration of a first example of a method for determining the position of a motor vehicle. For this purpose, a position x of a motor vehicle is plotted in relation to the time t. Both the position x and the time t are represented in arbitrary units, which is indicated by the abbreviation "a. u." (arbitrary units). The position x is an instantaneous absolute position of the motor vehicle. It is indicated in this example by the one-dimensional coordinate x. A transfer to two or three dimensions is readily possible.

A first signal 1 or an absolute position of the motor vehicle contained therein is shown. For example, the first signal 1 can be obtained via satellite navigation. The first signal 1 is not always available. This is indicated by an availability 11, which is also shown. The availability 11, which is shown as a square-wave signal, indicates when the very precise first signal 1 is available. If the availability 11 is at its higher value (which can correspond to a logical one, for example), the first signal 1 is available. In this case, the absolute position contained in the first signal 1 corresponds to the instantaneous absolute position of the motor vehicle. If the availability 11 is at its lower value (which can correspond to a logical zero, for example), the first signal 1 is not available. In this case, the last known value is assumed for the absolute position of the motor vehicle. This can be seen in that the first signal 1 is shown as constant in these regions. The values of the first signal 1 thus only change if the availability is "up". If the availability is "down", the last value is maintained.

Furthermore, a second signal 2 or a change of the position of the motor vehicle contained therein is shown. This is shown in that the second signal 2 corresponds in the time origin (i.e. on the very left in the illustration) to the instantaneous absolute position of the motor vehicle. Proceeding from the time origin, the position x has continued according to the change of the position contained in the second signal 2. It can be seen in this case that over the time, an error has built up (which is particularly large here for illustration). However, in contrast to the first signal 1, the second signal 2 is always available.

A first item of position information 3 is ascertained from the first signal 1 and from the second signal 2. In this example, this is the finally output item of position information. The first item of position information 3 is composed of the precise first signal 1, when values are present, and is otherwise continued by the always available second signal 2. The slope of the first item of position information 3 and of the second signal 2 is equal if the first signal 1 is not available. At the moments in which the first signal 1 is not available, the first item of position information 3 (still) corresponds to the first signal 1. An accumulated error is eliminated again and again by this support of the first item of position information 3 as soon the first signal 1 is available again. The first item of position information 3 is thus substantially more accurate than the second signal 2, because an error does not continuously accumulate.

Figure 2:
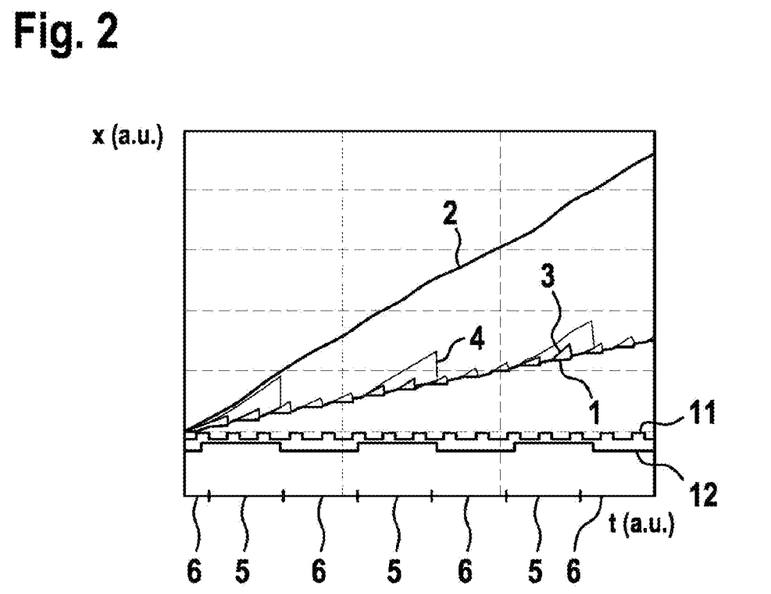
FIG. 2: shows an illustration of a second example of a method for determining the position of a motor vehicle.

FIG. 2 shows an illustration of a second example of a method for determining the position of a motor vehicle. As in FIG. 1, the position x of the motor vehicle is also plotted in relation to the time in FIG. 2. The first signal 1, the second signal 2, the first item of position information 3, and the availability 11 are shown similarly as in FIG. 1.

Furthermore, a second item of position information 4 is shown in FIG. 2. The second item of position information 4 corresponds at the beginning of first time periods 5 to the first item of position information 3. The second item of position information 4 is continued according to the change of the position from the second signal 2 over the first time periods 5. In second time periods 6, the second item of position information 4 corresponds to the first item of position information 3.

The first time periods 5 and/or the second time periods 6 are specified by a release signal 12. If the release signal 12 is at its higher value (which can correspond to a logical one, for example), the second item of position information 4 is determined using the second signal 2. This is the case in the first time periods 5. If the release signal is at its lower value (which can correspond to a logical zero, for example), the second item of position information 4 is determined using the first signal 1. This is the case in the second time periods 6.

In the example from FIG. 2, the second item of position information 4 is partially not supported by the first signal 1. Jumps in the signal curve can thus be avoided.

It is obvious that in the case of the first item of position information 3, the accuracy decreases with time. Nonetheless, the first signal 1 cannot be used as the final item of position information because in some cases jumps are to be avoided.

The user can determine when support is to occur and when it is not. This can be performed in particular by specifying the release signal 12. The second item of position information 4 deviates from the first item of position information 3 as soon as the support is no longer taken into consideration. When a support is permitted again (when the release signal 12 is thus down), the second item of position information 4 will then again be equal to the first item of position information 3. The release signal 12 can be specified as a periodic square-wave signal, as shown in FIG. 2 in particular.

Figure 3:
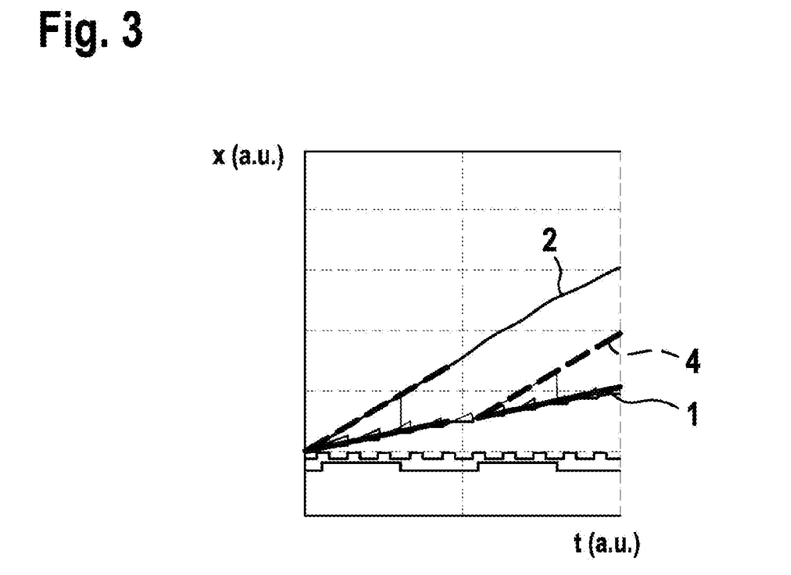
FIG. 3: shows an enlarged illustration of the method from FIG. 2, FIGS. 4 to 6: show three examples of a time curve of an error.

FIG. 3 shows an enlarged illustration of the method from FIG. 2. In particular the first signal 1 and the second item of position information 4 are highlighted by thick lines. An error which results from the continuation of the position determination via the second signal 2 can be ascertained by a comparison between the first signal 1 and the second item of position information 4. This error can be used as an error of the first item of position information 3.

Figure 4:
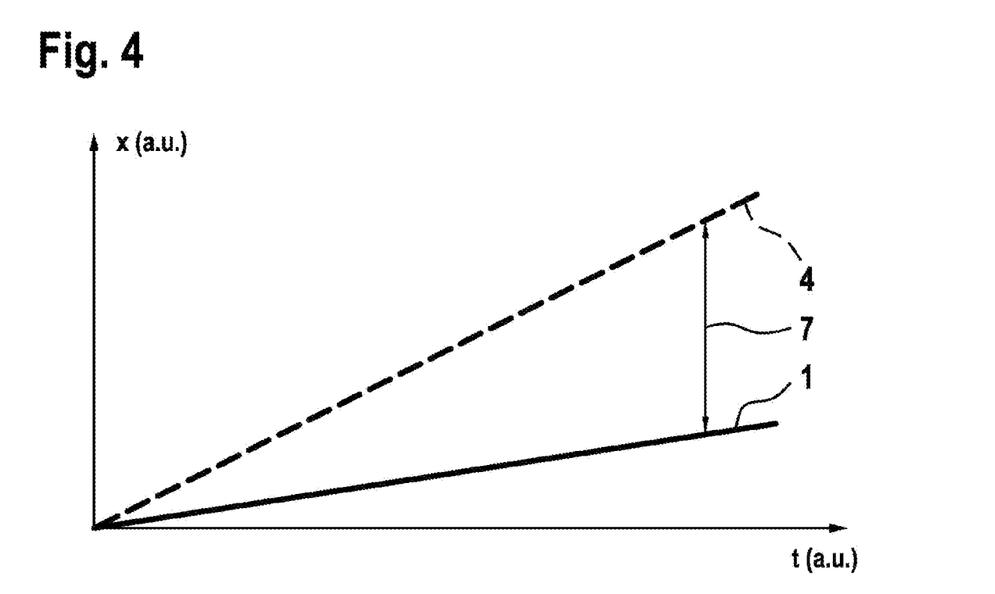
Figure 5:
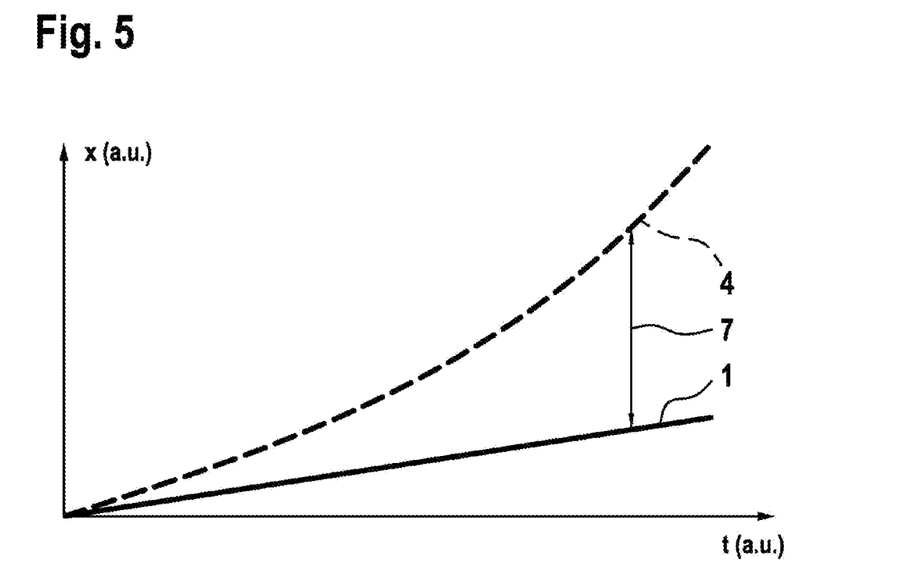
Figure 6:
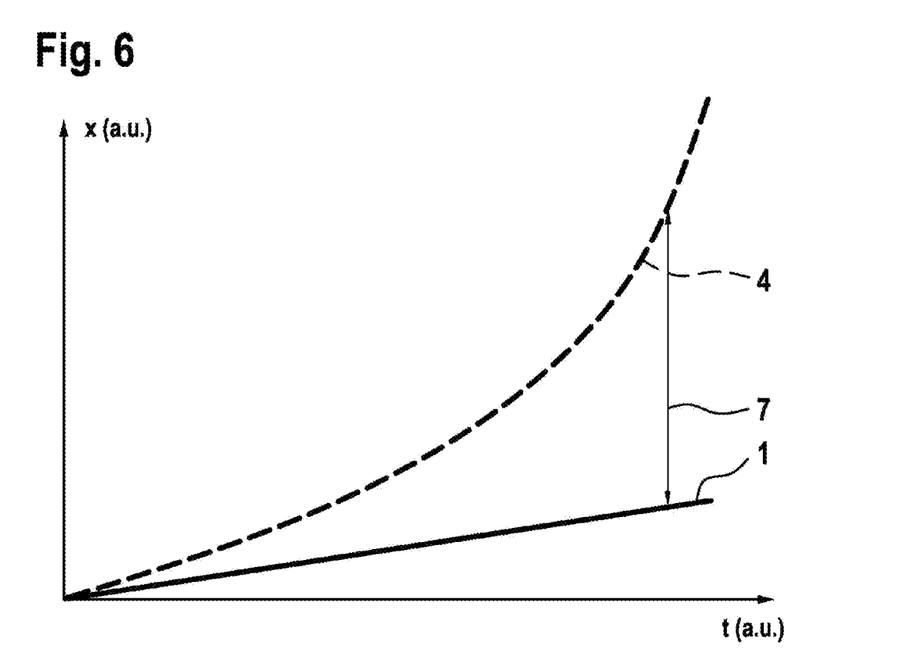

FIGS. 4 to 6 show three examples of a time curve of an error 7. This error 7 can be ascertained in particular as described for FIG. 3.

It is to be noted in this case that in FIGS. 4 to 6, the first signal 1 and the second item of position information 4—in contrast to FIG. 3—are not themselves shown as a time curve. Rather, in each of FIGS. 4 to 6, it is specified for a plurality of discrete determination points in time (which can each be at the end of a first time period 5, for example) how large the error 7 is. The error 7 thus results from the chronological development of the distance between the first signal 1 and the second item of position information 4 at the determination points in time. The determination points in time are thus plotted on the time axis in FIGS. 4 to 6. A (nearly) continuous representation of the time curve of the error 7 as in FIGS. 4 to 6 can be obtained by a sufficiently large number of determination points. A linear chronological development of the error 7 is shown in FIG. 4, a quadratic one is shown in FIG. 5, and an exponential one is shown in FIG. 6. Only three types of errors are shown in FIGS. 4 to 6. Other types of errors (for example having a drift and/or having an offset) and combinations of various types of errors can also be detected and handled using the method, of course.

Figure 7:
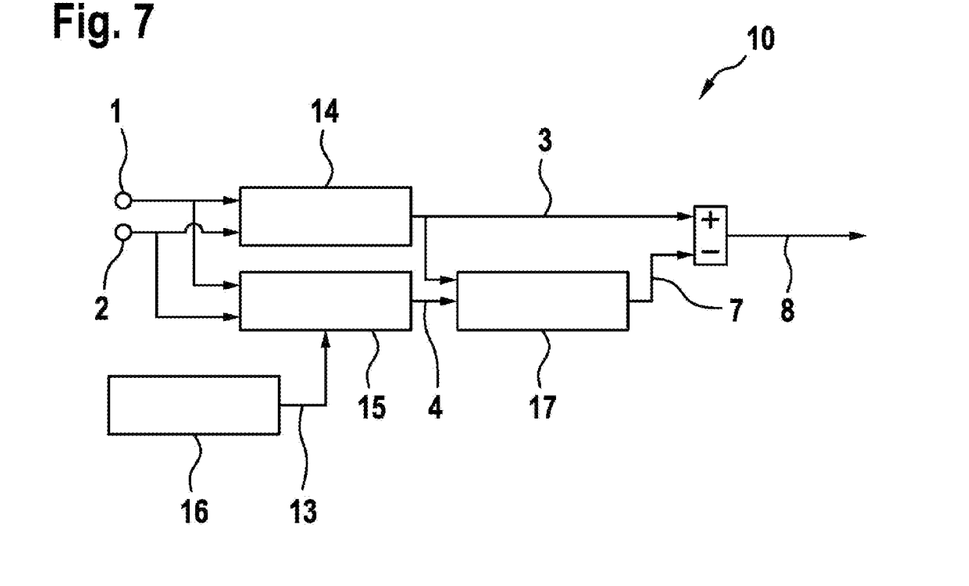
FIG. 7: shows a first illustration of a sequence of the method from FIGS. 2 and 3, and FIG. 8: shows a second illustration of a sequence of the method from FIGS. 2, 3, and 7.

FIG. 7 shows a first illustration of a sequence of the method from FIGS. 2 and 3. For this purpose, the functionality is shown on the basis of a simplified block diagram. The first signal 1 and the second signal 2 are each conducted in this case to a first determination element 14 and a second determination element 15. The first item of position information 3 is ascertained in the first determination element 14, and the second item of position information 4 is ascertained in the second determination element 15. For this purpose, the second determination element 15 receives a command 13 to compute an error 7 from a corresponding control element 16. The first item of position information 3 and the second item of position information 4 are compared in a comparison element 17. The error 7 is thus obtained. An output signal 8 is ascertained from the error 7 and the first item of position information 3.

Figure 8:
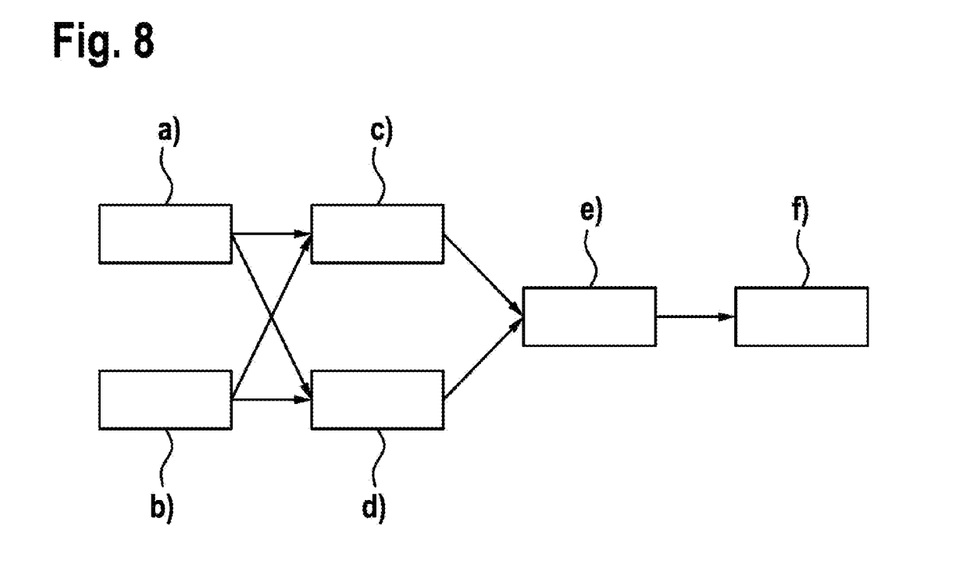

FIG. 8 shows a second illustration of a sequence of the method from FIGS. 2, 3, and 7. The method comprises the following method steps:

a) receiving the first signal 1, which comprises an absolute position of the motor vehicle, b) receiving the second signal 2, which comprises a change of the position of the motor vehicle, c) generating the first item of position information 3, which corresponds to the absolute position from the first signal 1, if the first signal 1 is available, and which is continued according to the change of the position from the second signal 2, if the first signal 1 is not available, d) generating the second item of position information 4, which corresponds at the beginning of the first time periods 5 to the first item of position information 3, and which is continued over the first time periods 5 according to the change of the position from the second signal 2, e) ascertaining the error 7 of the first item of position information 3 generated according to step c) using the second item of position information 4 generated according to step d), and f) outputting the output signal 8, which comprises the position of the motor vehicle, which is obtained from the first item of position information 3 ascertained according to step c) by correction using the error 7 ascertained in step e).

In the example shown, steps a) and b) and also steps c) and d) are each carried out simultaneously.

The invention claimed is:

1. A method for determining a position of a motor vehicle comprising:

receiving a first signal based on an absolute position of the motor vehicle, receiving a second signal based on a change of the position of the motor vehicle, generating a first item of position information corresponding to the absolute position from the first signal, when the first signal is available, and the generation of the first item of position information being continued according to the change of the position from the second signal, when the first signal is not available, generating a second item of position information in successive time periods, wherein at a beginning of each respective successive time period, the second item of position information is updated to correspond to a current absolute position of the motor vehicle and during each of the respective successive time periods, the second item of position information is updated based on the change of position indicated by the second signal, and ascertaining an error of the first item of position information using the second item of position information.

2. The method as claimed in claim 1, wherein the second signal is based on a first derivative of the position of the motor vehicle.

3. The method as claimed in claim 1, wherein the second signal is based on another position.

4. The method as claimed in claim 1, further comprising:
determining the error as a difference between the first item of position information and the second item of position information.

5. The method as claimed in claim 1, further comprising:
determining the error as a difference between the absolute position from the first signal and the second item of position information.

6. The method as claimed in claim 1, wherein the second item of position information in second time periods corresponds to the first item of position information.

7. The method as claimed in claim 1, further comprising:
outputting an output signal based on the position of the motor vehicle, which is obtained from the first item of position information and is corrected using the error.

8. The method as claimed in claim 7, further comprising:
performing the correction using an instantaneous value of the error.

9. The method as claimed in claim 7, further comprising:
ascertaining a time curve of the error; and
performing the correction with an extrapolation of the time curve of the error.

10. The method as claimed in claim 1, wherein a control device for the motor vehicle is configured to carry out the method.

11. The method as claimed in claim 1, wherein a computer program is configured to execute the method.

12. The method as claimed in claim 11, wherein the computer program is stored on a machine-readable storage medium.

* * * * *